United States Patent
Noellat

(10) Patent No.: US 10,049,844 B2
(45) Date of Patent: Aug. 14, 2018

(54) ELECTRICAL DISCONNECT DEVICE FOR A BATTERY

(71) Applicant: VIATEMIS, Saint Victor (FR)

(72) Inventor: Christophe Noellat, Kone, NC (US)

(73) Assignee: VIATEMIS, Saint Victor (FR)

(*) Notice: Subject to any disclaimer, the term of this patent is extended or adjusted under 35 U.S.C. 154(b) by 0 days.

(21) Appl. No.: 15/100,826

(22) PCT Filed: Nov. 26, 2014

(86) PCT No.: PCT/FR2014/053042
§ 371 (c)(1),
(2) Date: Jun. 1, 2016

(87) PCT Pub. No.: WO2015/082804
PCT Pub. Date: Jun. 11, 2015

(65) Prior Publication Data
US 2016/0314922 A1    Oct. 27, 2016

(30) Foreign Application Priority Data
Dec. 2, 2013  (FR) ...................... 13 61957

(51) Int. Cl.
*H01H 50/32* (2006.01)
*B60L 3/04* (2006.01)
(Continued)

(52) U.S. Cl.
CPC ............ *H01H 50/326* (2013.01); *B60L 3/04* (2013.01); *H01H 9/22* (2013.01); *H01H 19/46* (2013.01);
(Continued)

(58) Field of Classification Search
CPC . B60L 3/04; H01H 9/22; H01H 19/46; H01H 50/546; H01H 51/27; H01H 50/326; H01H 2050/328; H01H 19/6355
See application file for complete search history.

(56) References Cited

U.S. PATENT DOCUMENTS

| | | | | |
|---|---|---|---|---|
| 4,220,937 A | * | 9/1980 | Ritzenthaler | ........ H01H 50/326 335/164 |
| 6,087,737 A | * | 7/2000 | Alksnat | ..................... B60L 3/04 180/282 |

(Continued)

FOREIGN PATENT DOCUMENTS

| EP | 2 521 150 A1 | 11/2012 |
|---|---|---|
| GB | 2 246 240 A | 1/1992 |

OTHER PUBLICATIONS

International Search Report, dated Feb. 17, 2015, from corresponding PCT application.

*Primary Examiner* — Bernard Rojas
(74) *Attorney, Agent, or Firm* — Young & Thompson

(57) ABSTRACT

An electrical disconnect device includes:
 a pair of stationary terminals;
 a movable bridge that is movable between a closed position for making electrical contact between the pair of stationary terminals and an open position for breaking electrical contact;
 an electromagnetic control system that is switched between an open state in which the movable bridge is positioned in its open position, and a closed state in which it is positioned in its closed position; and
 a manual drive unit that are drivable between an operational position in which the movable bridge is free to move between its open and closed positions, and a forced-open position in which the manual drive unit holds the movable bridge spaced apart from the pair of
(Continued)

stationary terminals. The manual drive unit can be placed in a forced-closed position in which it blocks the movable bridge against the pair of stationary terminals.

9 Claims, 6 Drawing Sheets

(51) Int. Cl.
*H01H 9/22* (2006.01)
*H01H 19/46* (2006.01)
*H01H 50/54* (2006.01)
*H01H 51/27* (2006.01)
*H01H 19/635* (2006.01)

(52) U.S. Cl.
CPC .......... *H01H 50/546* (2013.01); *H01H 51/27* (2013.01); *H01H 19/6355* (2013.01); *H01H 2050/328* (2013.01)

(56) References Cited

U.S. PATENT DOCUMENTS

2014/0224629 A1* 8/2014 Rosch ................... H01H 1/20
200/329
2015/0213986 A1* 7/2015 Naka .................... H01H 50/42
335/189

* cited by examiner

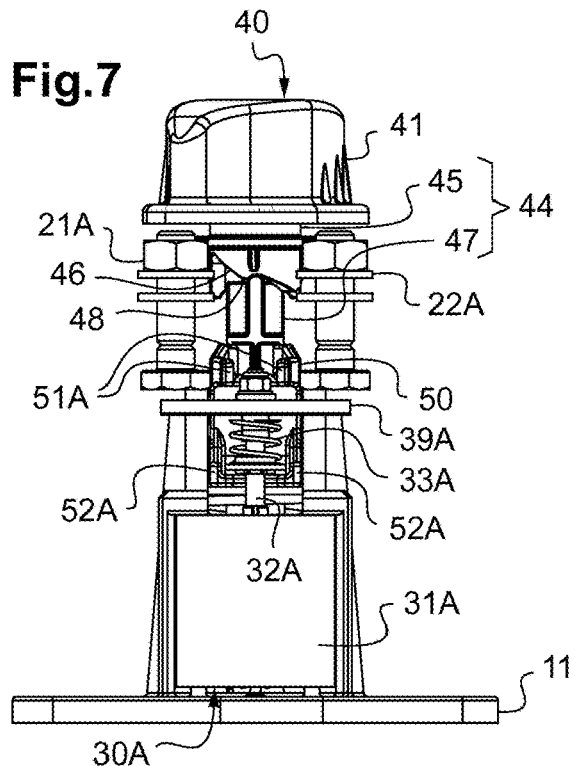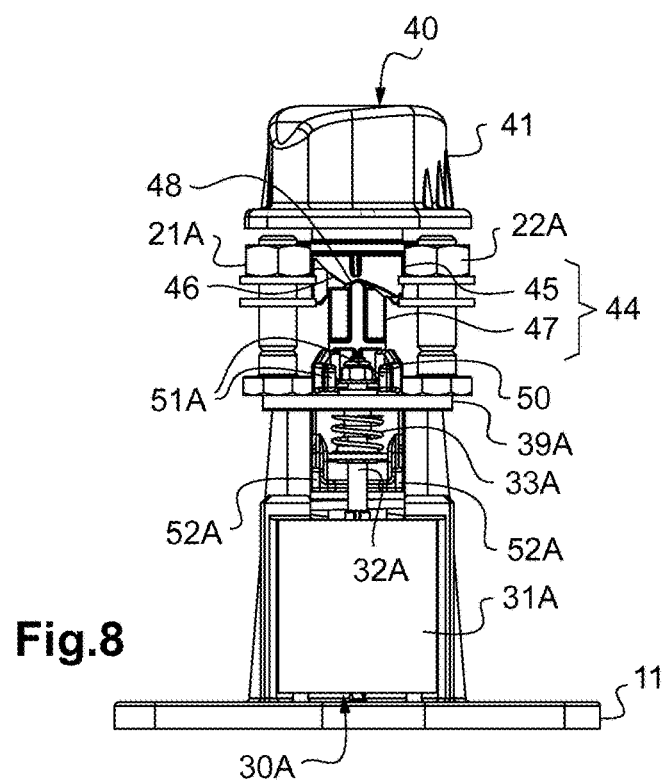

ELECTRICAL DISCONNECT DEVICE FOR A BATTERY

TECHNICAL FIELD TO WHICH THE INVENTION RELATES

The present invention generally relates to a device that makes it possible to isolate a battery from the various circuits to which the battery is connected.

It relates more particularly to an electrical disconnect device, comprising:
- a pair of stationary electrical connection terminals;
- a movable bridge that is movable between a closed position for making electrical contact between the pair of stationary terminals and an open position for breaking electrical contact between the pair of stationary terminals;
- an electromagnetic control system that is adapted to be switched between an open state in which it causes the movable bridge to be positioned in its open position, and a closed state in which it causes the movable bridge to be positioned in its closed position; and
- manual drive means that are drivable between firstly an operational position in which they allow the movable bridge to move freely between its open and closed positions as a function of the open or closed state of the electromagnetic control system, and secondly a forced-open position in which they hold the movable bridge spaced apart from the pair of stationary terminals, regardless of the open or closed state of the electromagnetic control system.

The invention finds a particularly advantageous application in providing a cutout for motor vehicles, in particular for trucks and boats.

TECHNOLOGICAL BACKGROUND

An electrical disconnect device as mentioned above is known in particular from document EP 2 521 150.

In that document, the disconnect device is described as including two pairs of stationary terminals and two electromagnetic control systems that are coupled to two movable bridges so as to break or make contact between the stationary terminals of the two pairs of terminals.

The two electromagnetic control systems thus enable electrical contact between the stationary terminals of each pair of terminals to be opened and closed automatically, without manual intervention.

In order to act on the battery or on a circuit to which the battery is connected, the manual drive means of the disconnect device make it possible to ensure that the movable bridges are held spaced apart from the stationary terminals, regardless of the state of the electromagnetic control systems. It is then possible to act on the battery or a circuit to which it is connected without risk.

To this end, the manual drive means include a knob that makes it possible, via a cam device, to push the movable bridges away from the stationary terminals.

Such a disconnect device is generally fitted in a motor vehicle.

An electrical failure could affect the electrical circuit of the disconnect device or the electrical circuit of the motor vehicle.

If the failure occurs when the movable bridges are in their open position, spaced apart from the stationary terminals, then the driver of the vehicle has no means of making electrical contact between the stationary terminals.

The driver can thus no longer start the engine of the vehicle.

OBJECT OF THE INVENTION

In order to remedy that drawback, the present invention proposes a solution that, when necessary, makes it possible manually to force closure of the electrical contact between the stationary terminals.

More particularly, the invention proposes a disconnect device as defined in the introduction, in which said manual drive means are also drivable towards a forced-closed position in which they hold the movable bridge in contact with the pair of stationary terminals, regardless of the open or closed state of the electromagnetic control system.

Thus, by means of the invention, in the event of a problem, the user may force the movable bridge to connect together the pair of stationary terminals. Thus, by way of example, the disconnect device may make an electrical connection between a battery and safety systems (typically a warning beacon).

It should be understood that using the manual drive means to provide this novel function is advantageous in the sense that the cost of manufacturing the disconnect device is not affected by incorporating this novel function.

Other characteristics of the disconnect device of the invention that are advantageous and non-limiting are as follows:
- there are provided: two pairs of stationary terminals; two movable bridges that are adapted to make electrical contact between the respective pairs of stationary terminals; and two electromagnetic control systems that are adapted to move the two movable bridges respectively; said manual drive means being adapted to hold at least one of the two movable bridges in contact with the respective pair of stationary terminals;
- in the forced-open position, the manual drive means simultaneously hold the two movable bridges spaced apart from the respective pairs of stationary terminals, and in the forced-closed position, the manual drive means block the two movable bridges in contact with the respective pairs of stationary terminals;
- the manual drive means comprise a knob that is movable in turning, a fork that is movable in translation and that includes two pairs of arms that are adapted to hold the movable bridge respectively in contact with, and spaced apart from, the pairs of stationary terminals, and movement conversion means that are adapted to convert the turning movement of the knob into movement in translation of the fork;
- the fork includes two pairs of arms respectively adapted to hold the two movable bridges in contact with, and spaced apart from, the two pairs of stationary terminals;
- the movement conversion means comprise a cam having a profile that presents at least three seats, a lug shaft that is formed integrally with the fork and that includes at least one lug that is adapted to travel along the profile of the cam, and resilient return means for returning the lug against the profile of the cam;
- the electromagnetic control system comprises a core that is made of magnetic material and that is mounted to move in a body, a coil that surrounds said core and that is for powering electrically so as to generate a magnetic field that delivers a traction force on said core, a movable shaft that bears axially against the core and that is coupled to said movable bridge, and first resilient return means for pushing the movable shaft towards the rear, against the core;

the movable bridge is engaged around the movable shaft, and second resilient return means are provided for pushing the movable bridge towards the front, against an abutment provided on the movable shaft;

locking means are provided for locking the manual drive means in the forced-open position; and a casing is provided that houses the movable bridge and the electromagnetic control system, the manual drive means comprise a knob, and said locking means comprise an opening that is situated in the knob, and a cavity groove elsewhere that is situated recessed into the casing, in the axis of said opening when the manual drive means are in the forced-open position.

DETAILED DESCRIPTION OF AN EMBODIMENT

The following description of non-limiting examples given with reference to the accompanying drawings, makes it possible to understand what the invention consists of and how it can be reduced to practice.

In the accompanying drawings:

FIGS. 7 to 10 are diagrammatic side views of the FIG. 1 disconnect device, shown in four different states, and in which the casing of the disconnect device is not shown.

FIG. 1 shows a disconnect device 1.

In this embodiment, the disconnect device is a cutout switch 1 for a motor vehicle, which cutout switch isolates, if necessary, a battery from the various electrical circuits to which the battery is connected.

The cutout switch 1 includes a casing 10 from which there emerges at least two stationary electrical connection terminals 21A, 22A, of which one is for connecting to the battery, and the other is for connecting to the electrical circuits of the motor vehicle.

Figure 2:
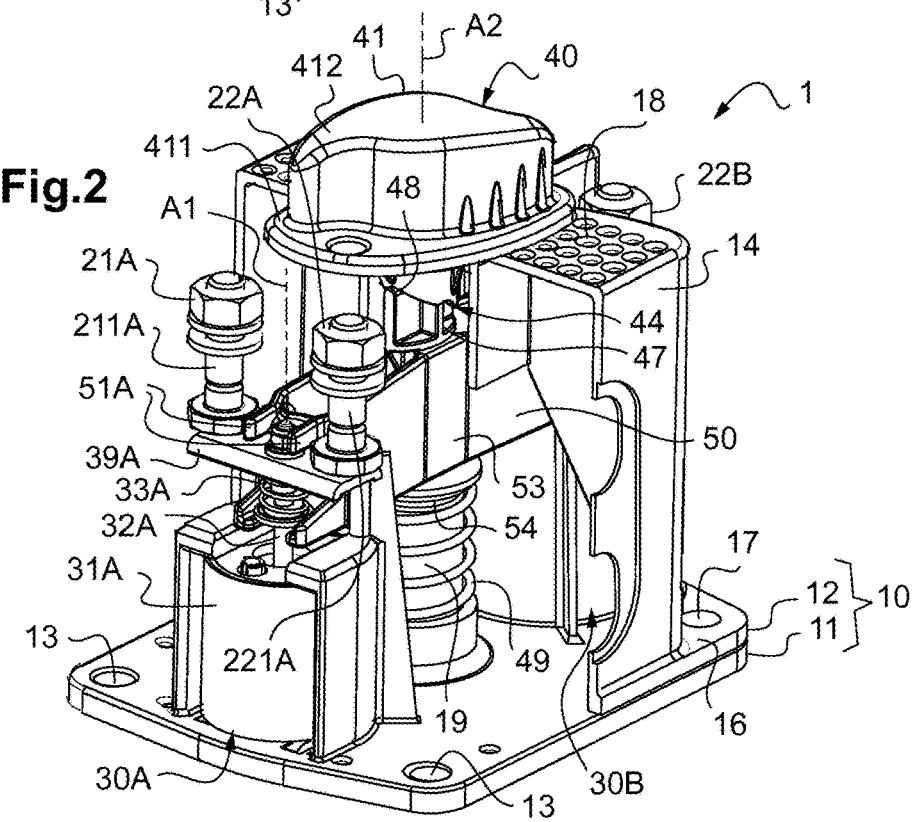
FIG. 2 is a diagrammatic perspective view of the FIG. 1 disconnect device, in which the casing of the disconnect device is cut away.

As shown in FIG. 2, the cutout switch 1 also includes connection and disconnection means 30A for connecting together and disconnecting the pair of stationary terminals 21A, 22A.

The connection and disconnection means 30A include a movable bridge 39A that is movable between:

a closed position in which it is in contact with the stationary terminals 21A, 22A so as to make an electrical connection between the stationary terminals 21A, 22A; and an open position in which it is spaced apart from the stationary terminals 21A, 22A so as to break the electrical connection between the stationary terminals 21A, 22A.

They also include an electromagnetic control system 31A that is designed to move the movable bridge 39A between its closed position and its open position automatically (i.e. without manual intervention on the cutout switch 1).

To this end, the electromagnetic control system 31A is adapted to be switched between an open state in which it causes the movable bridge 39A to be positioned in its open position, and a closed state in which it causes the movable bridge 39A to be positioned in its closed position.

When it is in its closed state, the electromagnetic control system 31A is designed to exert a force F1 on the movable bridge 39A, so as to press it into contact with the stationary terminals 21A, 22A. When an opposite-direction force F2 of magnitude that is greater than the force F1 is exerted on the movable bridge 39A, the system is also designed to push said movable bridge away from the stationary terminals 21A, 22A.

Figure 12:
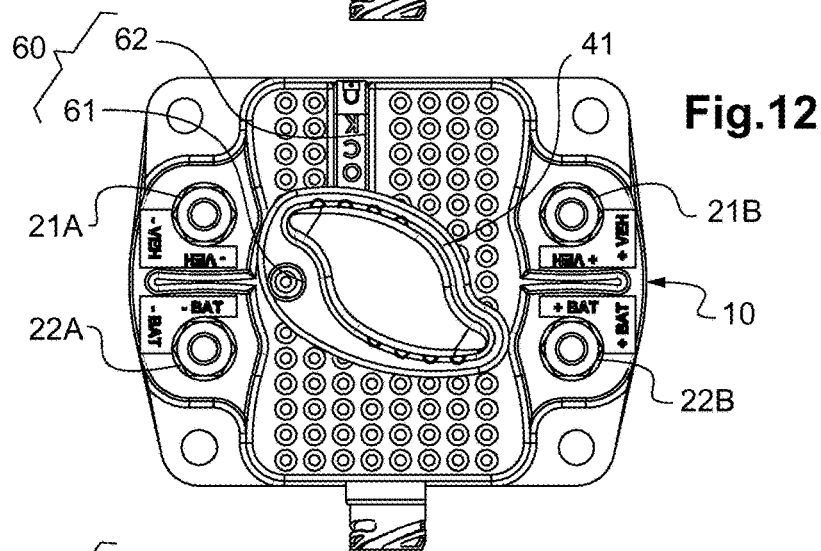
Figure 13:
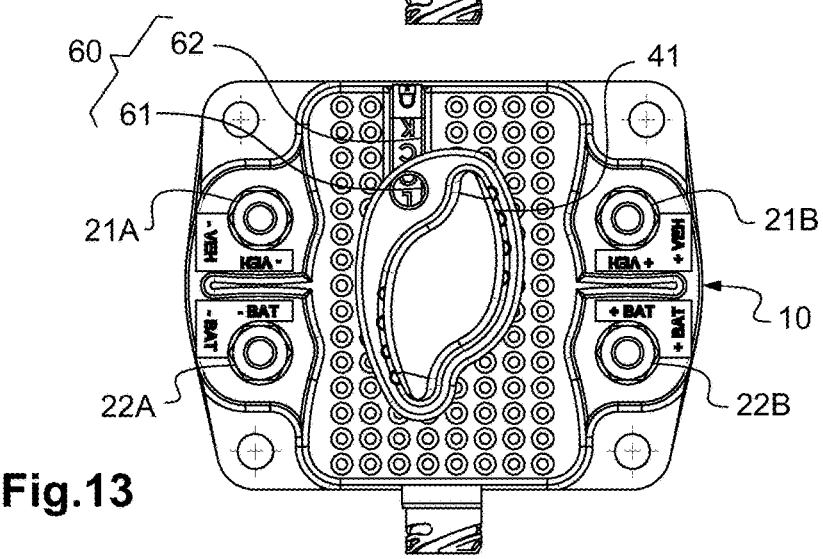

The cutout switch 1 also includes manual drive means that are drivable between an operational position (FIG. 12) and a forced-open position (FIG. 13).

When the manual drive means 40 are in the operational position, they leave the movable bridge 39A, 39B free, so its position then depends only on the state of the electromagnetic control system 31A. Thus, when the electromagnetic control system 31A is in its open state, the movable bridge 39A is positioned automatically in its open position, and when the electromagnetic control system 31A is in its closed state, the movable bridge 39A is positioned automatically in its closed position.

In contrast, when the manual drive means 40 are in the forced-open position, they are designed to hold the movable bridge 39A spaced apart from the pair of stationary terminals 21A, 22A, regardless of the open or closed state of the electromagnetic control system 31A.

In other words, when the manual drive means 40 are placed in the forced-open position, they are adapted to exert a force F2 of magnitude that is greater than the opposite-direction force F1 on the movable bridge 39A.

They thus make it possible to isolate the battery electrically, regardless of the open or closed state of the electromagnetic control system 31A.

In this embodiment, when it is in its open state, the electromagnetic control system 31A is also designed to exert a force F3, so as to hold the movable bridge 39A spaced apart from the stationary terminals 21A, 22A. When an opposite-direction force F4 of magnitude that is greater than the force F3 is exerted on the movable bridge 39A, the system is also designed to push said movable bridge into contact with the stationary terminals 21A, 22A.

According to a particularly advantageous characteristic of the invention, the manual drive means are thus drivable towards a forced-closed position (FIG. 11) in which they hold (or block) the movable bridge 39A in contact with the pair of stationary terminals 21A, 22A, regardless of the open or closed state of the electromagnetic control system 31A.

In other words, when they are placed in the forced-closed position, the manual drive means 40 are adapted to exert a force F4 of magnitude that is greater than the force F3 on the movable bridge 39A in the opposite direction.

They thus make it possible to force the battery to be connected to the electrical circuits of the motor vehicle, regardless of the open or closed state of the electromagnetic control system 31A.

Figure 1:
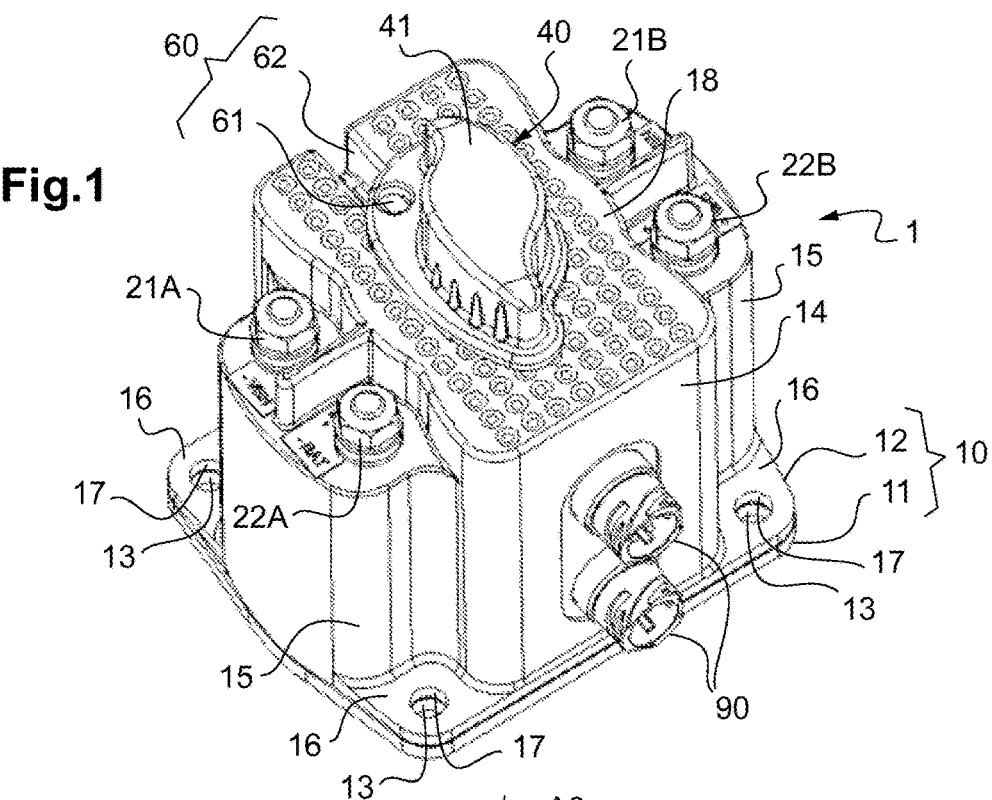
FIG. 1 is a diagrammatic perspective view of a disconnect device of the invention.

In the embodiment shown in FIGS. 1 and 2, the casing 10 is made of two portions, a base 11 and a cover 12.

The base 11 presents a rectangular-plate shape that is perforated at its four corners with four openings 13.

The cover 12 presents a box shape that is open beside the base 11, so as to cooperate therewith to define a housing. It thus includes a front wall 18 that is bordered by a side wall projecting in one direction therefrom.

In the description below, the terms "front" and "rear" are used relative to the base 11 and the cover 12, the base 11 being considered as being positioned to the rear of the cover 12. In the embodiment shown in the figures, in which the base 11 is positioned horizontally and in which the cover 12 is fitted on top of the base 11, the front of an element designates the side of the element that faces upwards, and the rear designates the side of the element that faces downwards.

More precisely, the cover 12 includes a generally rectangular central portion 14 that houses the manual drive means 40, flanked by two side portions 15 each housing connection and disconnection means 30A, 30B.

In order to fasten it to the structure of the motor vehicle, the cover 12 includes, at the four corners of its rear edge, four tabs 16 that are each perforated with respective openings 17 that are in line with the openings 13 in the base 11.

The aligned openings 13, 17 thus make it possible to pass four fastener bolts for fastening the cover 12 and the base 11 to the structure of the motor vehicle.

In this embodiment, the cover 12 and the base 11 include means that make it possible to fasten them together. In this embodiment, the means are in the form of bolts that are engaged via the rear of the base 11, having heads that bear against the base 11, and having threaded shanks that are screwed into the cover 12.

As shown in FIG. 1, in this embodiment the cutout switch 1 includes two pairs of stationary terminals 21A, 22A, 21B, 22B.

A first pair of stationary terminals 21A, 22A is designed to be connected between the negative terminal of the battery and the negative terminal of the electrical circuits of the vehicle.

A second pair of stationary terminals 21B, 22B is designed to be connected between the positive terminal of the battery and the positive terminal of the electrical circuits of the vehicle.

The two pairs of terminals are designated by means of the letters "A" and "B". They are identical and they are connected or disconnected by identical connection and disconnection means 30A, 30B (see FIG. 5). Consequently, for more clarity in the description below, only the first pair of stationary terminals 21A, 22A and their corresponding connection and disconnection means 30A are described.

Figure 4:
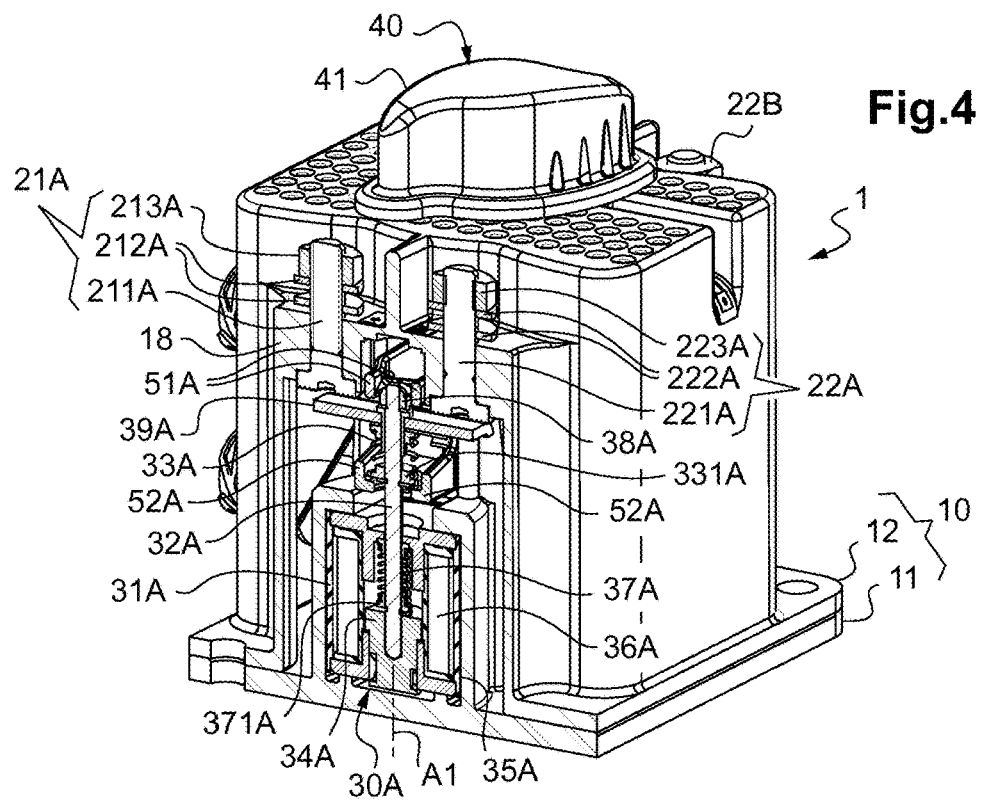

As shown more particularly in FIG. 4, in this embodiment, each stationary terminal 21A, 22A is formed of a metal assembly comprising a bolt 211A, 221A, two washers 212A, 222A, and a nut 213A, 223A.

Each bolt 211A, 221A is engaged in a hole formed through the front wall 18 of the cover 12, at one of the side portions 15 of the cover 12. It is engaged therein via the rear so that its head bears against the rear of the front wall 18, and its threaded shank emerges in front of the front wall 18.

The two washers 212A, 222A are engaged on the threaded shank of the bolt, in front of the front wall 18, so that they can sandwich a washer-like lug terminal that is fitted to the end of a conventional electric cable.

The nut 213A, 223A is screwed on top of the washers 212B, 222A so as to clamp them tightly.

As shown in FIG. 2, the movable bridge 39A is housed in the casing 10 and, in the closed position, it is designed to bear simultaneously against both of the heads of the bolts 211A, 221A of the stationary terminals 21A, 22A.

In this embodiment, the bridge is in the form of a rectangular plate that is made of conductive metal (typically of copper), having two side edges that are folded rearwards.

The movable bridge 39A presents a plane front face having a length and a width that are sufficient to enable it to bear against the rear faces of the heads of the bolts 211A, 221A of the pair of stationary terminals 21A, 22A.

The electromagnetic control system 31A used in this embodiment is described in patent FR 2 899 721. More particularly, the electromagnetic control system is that shown in FIG. 1 of patent FR 2 899 721.

The electromagnetic control system 31A is therefore not described in detail herein.

Figure 3:
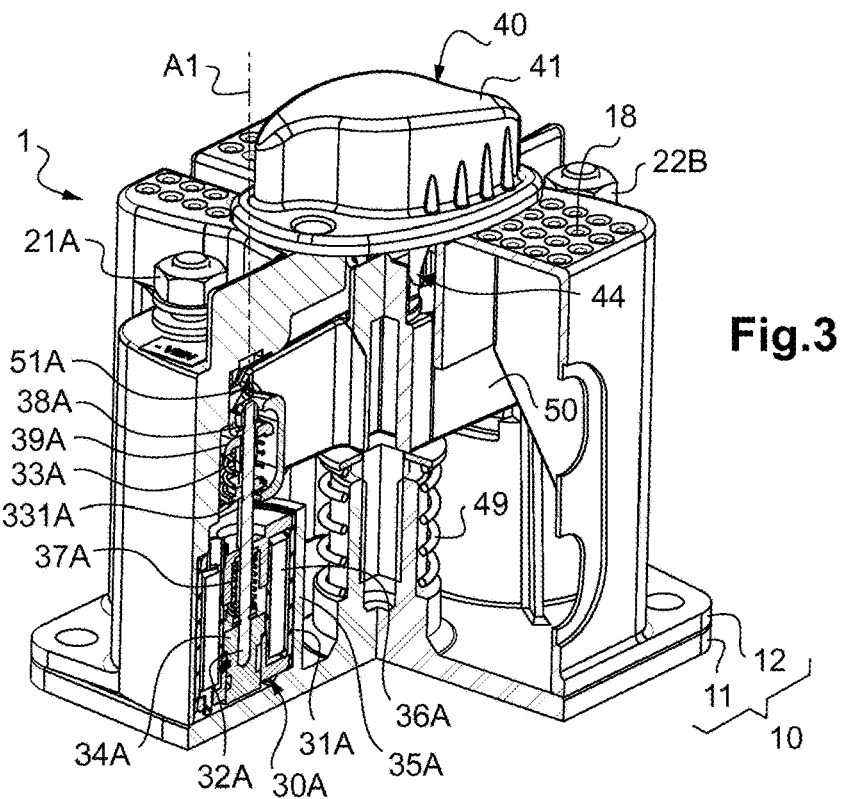
FIGS. 3 and 4 are diagrammatic perspective views of the FIG. 1 disconnect device, in section on two different section planes.

With reference to FIGS. 3 and 4, it is merely observed that it comprises: a body 35A; a core 34A that is made of magnetic material and that is mounted to move in translation along a main axis A1 in the body 35A; and a coil 36A that is housed in the body 35A, that surrounds said core 34A and that is for powering electrically so as to generate a magnetic field that delivers a traction force on the core 34A.

In this embodiment, the body 35A is fastened on the base 11 by means of partitions that project upwards from the front of the base 11, and that hold it in position.

The electromagnetic control system 31A also comprises a movable shaft 32A having a rear end that is engaged in a blind hole provided in the core 34A so as to be capable of sliding in said core along the main axis A1, and having a front end that is coupled to the movable bridge 39A.

In order to hold the rear end of the movable shaft 32A bearing axially against the bottom of the blind hole of the core 34A, a first compression spring 37A is provided that is engaged around the movable shaft 32A and that is prestressed between the body 35A and a first abutment 371A that is provided on the movable shaft 32A. The first compression spring 37A thus makes it possible to push the movable shaft 32A rearwards. In the description below, the first compression spring is referred to as a "rear spring 37A".

In order to couple the front end of the movable shaft 32A to the movable bridge 39A, an opening is provided in the center of the movable bridge 39A, which opening is engaged freely around the movable shaft 32A so that the movable bridge 39A can slide on said movable shaft along the main axis A1.

A second compression spring 33A is also provided that is threaded onto the movable shaft 32A and that is prestressed between the movable bridge 39A, 39B and a second abutment 331A that is provided on the movable shaft 32A. The second compression spring 33A thus makes it possible to push the movable bridge 39A, 39B towards the front, against a third abutment 38A that is provided at the front end of the movable shaft 32A. In the description below, the second compression spring 33A is referred to as a "front spring 33A".

When the coil 36A is unpowered, a cam system (not shown in the figures) makes it possible to hold the core 34A in one or the other of two stable positions situated at different heights, and, when the coil 36A is powered, it enables the coil 34A to move from one of the two stable positions to the other.

The two stable positions correspond to the closed and open states of the electromagnetic control system 31A Switch means are thus provided that enable the coil 36A to be electrically powered so as to position the core 34A in one or the other of its two stable positions.

The switch means, which are not themselves the subject of the present invention, are not described in detail. It should merely be observed that they comprise an electronic card (not shown) that is housed in the casing 10, and one or two connectors 90 (as shown in FIG. 1) that project from the side wall of the cover 12 and that enable the electromagnetic control systems 31A, 31B to be switched electronically from outside the cutout switch 1.

In this embodiment, the manual drive means 40 that are drivable between the operational position (or AUTO position), the forced-open position (or OFF position), and the forced-closed position (or ON position) are preferably adapted to act simultaneously on the two movable bridges 39A, 39B.

They are thus designed:
  in the operational position, to allow the two movable bridges 39A, 39B to move freely in translation along the main axis A1;
  in the forced-open position, to hold the two movable bridges 39A, 39B spaced apart from the stationary terminals 21A, 22A, 21B, 22B; and
  in the forced-closed position, to block the two movable bridges 39A, 39B against the stationary terminals 21A, 22A, 21B, 22B.

In the forced-open position, they thus make it possible to isolate the battery both on the side of its negative terminal and on the side of its positive terminal.

Figure 5:
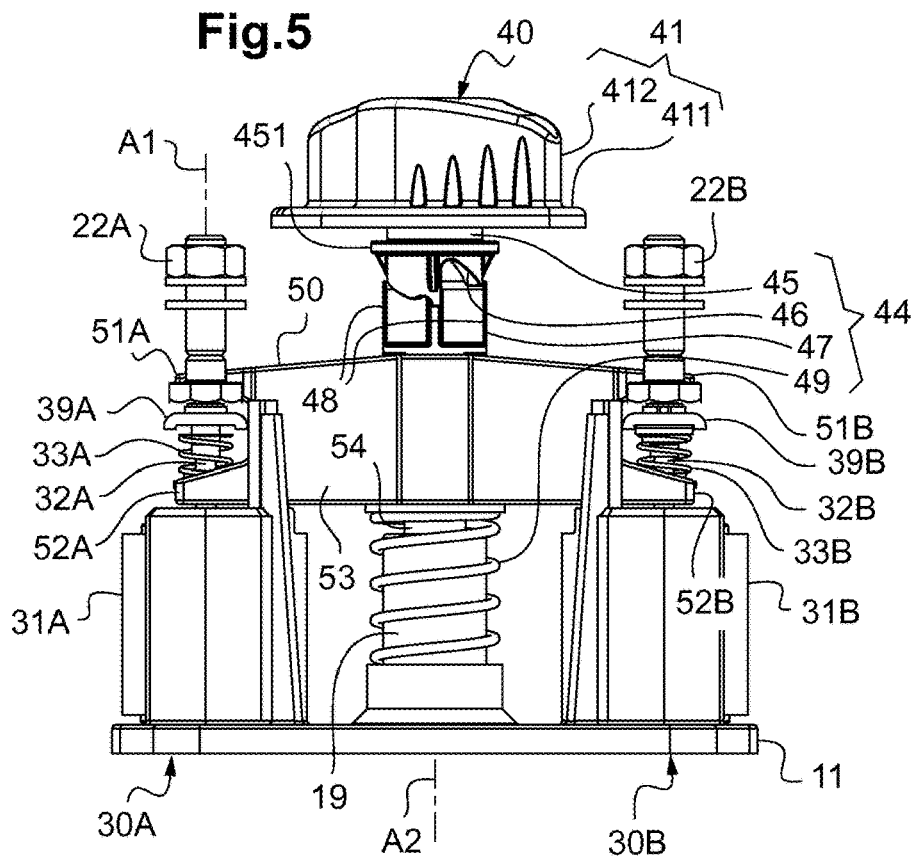
FIG. 5 is a diagrammatic side view of the FIG. 1 disconnect device, in which the casing of the disconnect device is not shown.

As shown clearly in FIGS. 2 and 5, the manual drive means 40 comprise: a knob 41 that is accessible to the user and that can be turned relative to the casing 10; a fork 50 that is movable in translation relative to the casing 10 and that makes it possible to act simultaneously on both movable bridges 39A, 39B; and movement conversion means 44 that are adapted to convert the turning movement of the knob 41 into translation movement of the fork 50.

The knob 41 includes a plane base 411, having a front face from which there projects a bulge 412 with an S-shape that makes it easier to turn.

At the rear of its base 411, the knob 41 also includes a shaft 45 that is circularly tubular about a central axis A2 that is parallel to the main axis A1. The knob 41 is mounted to turn on the casing 10 about the central axis A2 by means of the shaft 45 that is engaged freely through a corresponding opening provided in the front wall 18 of the cover 12.

As shown in FIG. 5, spaced apart from the rear face of the base 411, the shaft 45 presents a collar 451 that bears against the rear face of the front wall 18, while the base 411 bears against the front face of the front wall 18, thereby making it possible to prevent the knob 41 from moving in translation along the central axis A2.

As shown in FIGS. 2 and 5, the fork 50 includes a bar 53 and a guide shaft 54.

Lengthwise, the bar 53 extends radially relative to the central access A2, between the two connection and disconnection means 30A, 30B.

The guide shaft 54 extends from the center of the rear face of the bar 53, orthogonally thereto, so as to co-operate therewith to form a T-shape.

The guide shaft 54 is slidably engaged in a sleeve 19 that projects from the center of the front face of the base 11 of the casing 10. It guides the fork 50 in translation along the central axis A2, towards the front or towards the rear.

As shown in FIG. 2, at each of its ends, the bar 53 presents a front arm 51A and a rear arm 52A that are situated respectively at the front and at the rear of the movable bridge 39A.

Each of these front and rear arms 51A, 52A is formed of two fingers that extend on either side of the movable shaft 32A, 32B so as not to interfere therewith.

Figure 9:
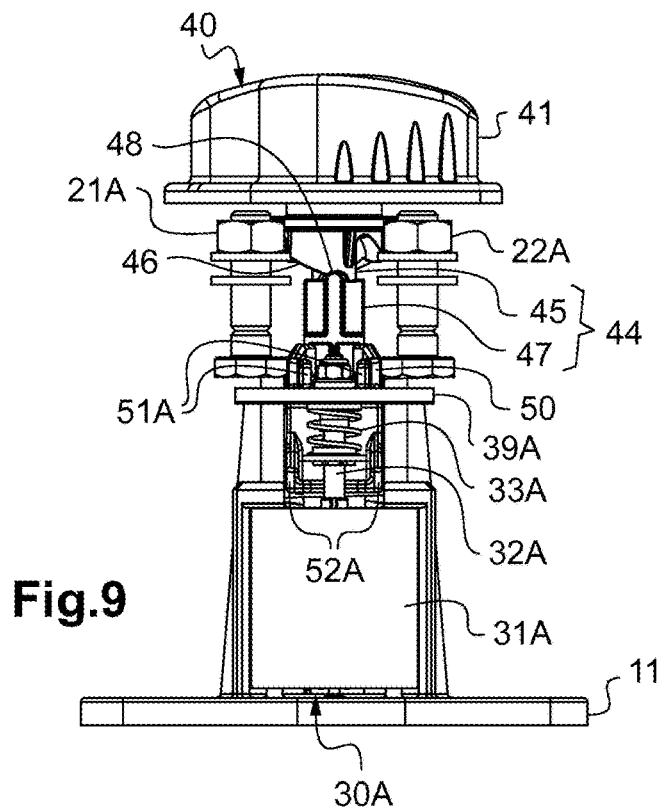

As shown in FIG. 9, the two fingers of each front arm 51A of the fork 50 are designed to bear against the top faces of the movable bridges 39A, so as to block them spaced apart from the stationary terminals 21A, 22A when the drive means 40 are in the forced-closed position.

Figure 10:
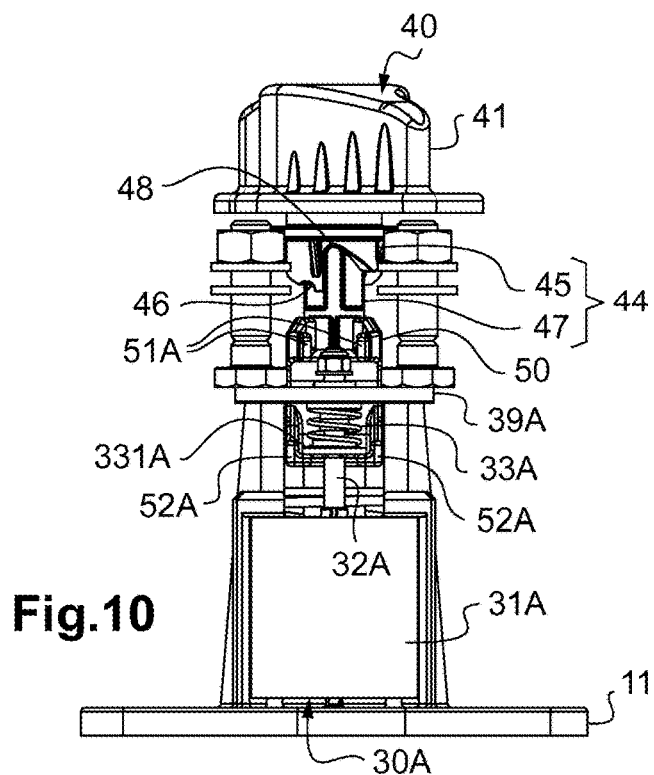

As shown in FIG. 10, the two fingers of each rear arm 52A of the fork 50 are designed to bear below the second abutments 331A of the movable shafts 32A (namely those against which the front springs 33A bear) so as to hold the movable bridges 39A against the stationary terminals 21A, 22A when the drive means 40 are in the forced-closed position.

As shown in FIG. 5, the movement conversion means 44, that enable the fork 50 to slide as a result of the knob 41 turning, include a cam 46 and a lug shaft 47.

In this embodiment, the cam profile 46 is formed by the rear edge of the shaft 45. The cam profile 46 presents three seats 461, 462, 463 that are situated at different heights relative to the base 411.

In practice, in this embodiment, two cams 46 having three seats 461, 462, 463 are provided, each of which cams extends around the central axis A2 over an angular sector that is less than 180°.

Figure 6:
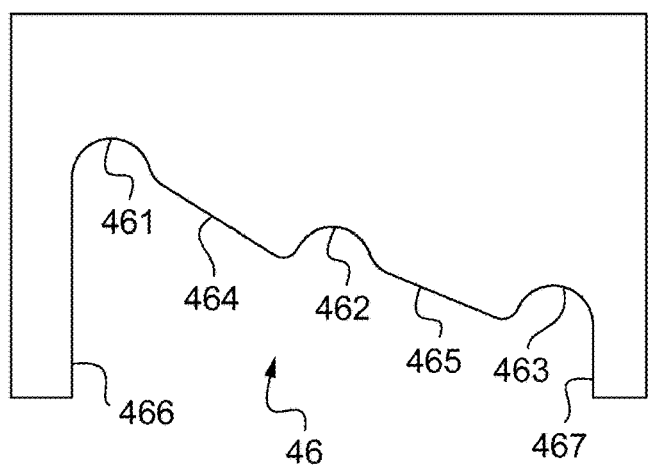
FIG. 6 is a developed view of a cam profile of the manual drive means of the FIG. 1 disconnect device.

FIG. 6 is a developed plane view of one of the cam profiles 46. It should be observed that the three seats 461, 462, 463 are formed by three semicircular notches that are separated from one another by sloping ramps 464, 465. The cam profile 46 is bordered by two straight edges 466, 467 having angular abutment functions.

As shown in FIGS. 2 and 5, the lug shaft 47 includes two corresponding lugs 48 that are situated on opposite sides of the central axis A2, and that are adapted to travel along the two cam profiles 46.

In practice, the lug shaft 47 projects from the front face of the bar 53 of the fork 50 along the central axis A2. It is made integrally with the fork 50.

On the central axis A2, it presents a cross-section that is in the shape of a cross. It is thus formed of four walls positioned in the shape of a cross. Two opposite first walls extend over a height that is greater than the height of the two other walls. The front edges of the two first walls are designed to come into contact with the two cam profiles 46 and thus form said lugs 48, while the front edges of the two other walls are situated further towards the rear so as not to come into contact with the cam profiles 46.

In this way, the lugs 48 are adapted to travel from one seat 461, 462, 463 to another when the user turns the knob 41. In contrast, they cannot travel from one cam profile 46 to the other as a result of the straight edges 466, 467 that form abutments for the two first walls.

As shown in FIGS. 2 and 5, resilient return means 49 are also provided for returning the lugs 48 against the cam profiles 46. In this embodiment, the resilient return means are formed by a compression spring 49 that is threaded on the sleeve 19 of the base 11 and that is prestressed between the base 11 and the rear face of the bar 53 of the fork 50 so as to push said fork towards the front.

In the description below, the compression spring 49 is referred to as a "main spring 49".

Once prestressed, it delivers a force that is strictly greater than the sum of the forces delivered by the front and rear springs 33A and 37A, so as to be capable of exerting forces on the two movable bridges 39A, 39B that are greater than the force exerted by the front and rear springs 33A and 37A, when the manual drive means 40 are in the forced-closed position and the electromagnetic control systems 31A, 31B are in their open state.

Finally the cutout switch 1 includes locking means 60 for locking the manual drive means 40 in the forced-open position.

The locking means 60 are designed to prevent the manual drive means 40 from being manipulated by a third party when not desired by the user, e.g. because the user is working on the battery of the vehicle or on the electrical circuits of the vehicle.

In this embodiment, as shown in FIG. 1, the locking means 60 comprise an opening 61 that is situated in the base 411 of the knob 41, and a rectilinear groove 62 that is recessed into the front face of the front wall 18 of the cover 12 of the casing 10.

The rectilinear groove 62 presents an end that is situated below the opening 61 when the manual drive means 40 are in the forced-open position, and a remote end that opens out onto the side of the cover 12.

The locking means 60 thus enable a user to fit a padlock through the knob 41 and along the rectilinear groove 62, which consequently prevents the knob 41 from being turned relative to the casing 10.

FIGS. 7 to 13 show various stable configurations that the cutout switch 1 may adopt.

In FIG. 12, the knob 41 is positioned such that the manual drive means 40 are in the operational position.

In this position, the lugs 48 are positioned on the seats 462 of the cams 46, which seats are situated mid-way along the cam profiles 46.

Thus, as shown in FIG. 7, when the electromagnetic control system 31A is switched to its open state, the rear spring 37A returns the movable shaft 32A towards the rear, which makes it possible to position the movable bridge 39A spaced apart from the stationary terminals 21A, 22A.

As shown in FIG. 8, when the electromagnetic control system 31A is switched to its closed state, the movable shaft 32A is pushed towards the front, and this makes it possible to press the movable bridge 39A against the stationary terminals 21A, 22A.

Figure 11:
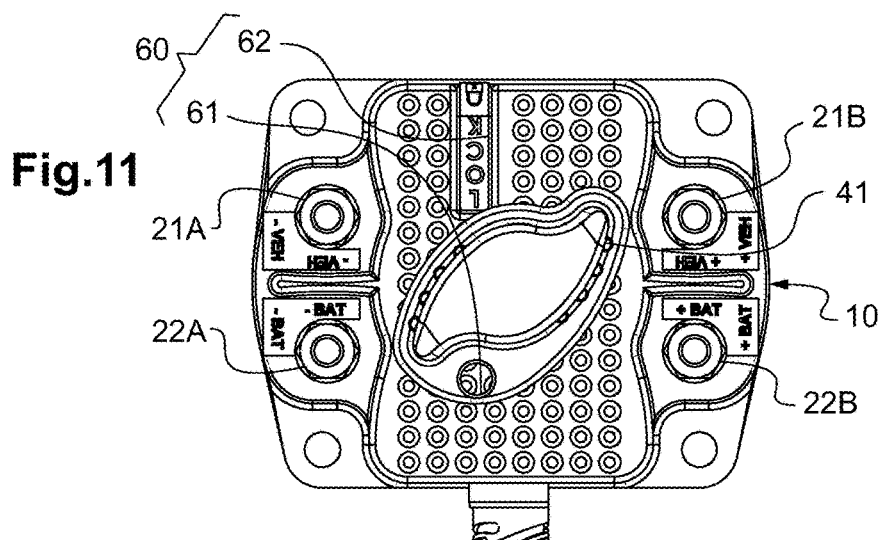
FIGS. 11 to 13 are diagrammatic plan views of the FIG. 1 disconnect device, in which the knob is shown in the forced-closed position, in the operational position, and in the forced-open position respectively.

In FIG. 11, the knob 41 is positioned such that the manual drive means 40 are in the forced-closed position.

In this position, the lugs 48 are positioned on the seats 461 of the cams 46, which seats are the furthest to the front.

As shown in FIG. 10, the rear arms 52A of the fork 50 thus pull the second abutment 331A towards the front, and this compresses the front spring 33A and forces the movable bridge 39A to bear against the stationary terminals 21A, 22A.

Thus, when the electromagnetic control system 31A is switched to its open state, the movable shaft 32A moves away from the bottom of the housing of the core 34A, compressing the rear spring 37A.

In contrast, when the electromagnetic control system 31A is switched to its closed state, the core 34A rises and pushes the movable shaft 32A towards the front, such that it participates in blocking the movable bridge 39A against the stationary terminals 21A, 22A.

In the forced-closed position, the state of the electromagnetic control systems 31A, 31B thus has no effect on the position of the movable bridges 39A, 39B. Thus, it is possible to make the electrical circuit between the stationary terminals manually in the event of an electrical problem affecting the switching of the electromagnetic control systems 31A, 31B, or in the event of a mechanical problem affecting the operation of the electromagnetic control systems 31A, 31B (in particular since the movable rods are not connected rigidly to the cores but are mounted to move relative thereto).

In FIG. 13, the knob 41 is positioned such that the manual drive means 40 are in the forced-open position.

In this position, the lugs 48 are positioned on the seats 463 of the cams 46, which seats are the furthest to the rear.

As shown in FIG. 9, the front arms 51A of the fork thus push the movable bridges 39A, 39B towards the rear, spaced apart from the stationary terminals.

Thus, when the electromagnetic control system 31A is switched to its closed state, the front spring 33A is compressed so as to enable the movable shaft 32A to rise.

In contrast, when the electromagnetic control system 31A is switched to its open state, the movable shaft 32A descends and participates in blocking the movable bridge 39A spaced apart from the stationary terminals 21A, 22A.

In the forced-open position, the state of the electromagnetic control systems 31A, 31B thus has no effect on the position of the movable bridges 39A, 39B.

The present invention is not limited to the embodiments described and shown, but the person skilled in the art can bring any variant thereto in accordance with its spirit.

In particular, the movable bridge could be hinge-mounted in the casing, so as to tilt between a position in contact with the stationary terminals and a position spaced apart from the stationary terminals.

In another variant, the electromagnetic control system could be of some other type. It could thus be in the form of a bistable electromagnet, in which event there would be no need to use front and rear springs to enable the fork to move the movable bridge against the force exerted by the electromagnetic.

In another variant, the manual drive means could comprise a lever instead of a knob, which lever would be mounted to move in translation on the casing and would be fastened to the fork.

In a variant embodiment of the cutout switch shown in the figures, the manual drive means could be adapted to act on only one of the two movable bridges, the position of the other bridge thus depending only on the open or closed state of its electromagnetic control system.

In still another variant, the cutout switch could be connected in some other way. Thus, provision could be made to connect a first pair of stationary terminals of the cutout switch between the positive terminal of a first battery (e.g. at 12 volts (V)) and the positive terminal of a first electrical circuit, and to connect the second pair of stationary terminals of the cutout switch between the positive terminal of a second battery (e.g. at 24 V) and the positive terminal of a second electrical circuit (preferably distinct from the first electrical circuit).

The invention claimed is:

1. An electrical disconnect device, comprising:
   a pair of stationary electrical connection terminals;
   a movable bridge that is movable between a closed position for making electrical contact between the pair of stationary terminals, and an open position for breaking electrical contact between the pair of stationary terminals;
   an electromagnetic control system that is adapted to be switched between an open state in which it causes the movable bridge to be positioned in its open position, and a closed state in which it causes the movable bridge to be positioned in its closed position; and manual drive means that are drivable between firstly an operational position in which they allow the movable bridge to move freely between its open and closed positions as a function of the open or closed state of the electromagnetic control system, and secondly a forced-open position in which they hold the movable bridge spaced apart from the pair of stationary terminals, regardless of the open or closed state of the electromagnetic control system;

wherein said manual drive means are also drivable towards a forced-closed position in which they hold the movable bridge in contact with the pair of stationary terminals, regardless of the open or closed state of the electromagnetic control system, and wherein the manual drive means comprise a knob that is movable in turning, a fork that is movable in translation and that includes two pairs of arms that are adapted to hold the movable bridge respectively in contact with, and spaced apart from, the pairs of stationary terminals, and movement conversion means that are adapted to convert the turning movement of the knob into movement in translation of the fork.

2. The electrical disconnect device according to claim 1, wherein there are provided:

two pairs of stationary terminals;

two movable bridges that are adapted to make electrical contact between the respective pairs of stationary terminals; and two electromagnetic control systems that are adapted to move the two movable bridges respectively; and wherein said manual drive means are adapted to hold at least one of the two movable bridges in contact with the respective pair of stationary terminals.

3. The electrical disconnect device according to claim 2, wherein, in the forced-open position, the manual drive means simultaneously hold the two movable bridges spaced apart from the respective pairs of stationary terminals, and in the forced-closed position, the manual drive means block the two movable bridges in contact with the respective pairs of stationary terminals.

4. The electrical disconnect device according to claim 1, wherein:

in the forced-open position, the manual drive means simultaneously hold the two movable bridges spaced apart from the respective pairs of stationary terminals, and in the forced-closed position, the manual drive means block the two movable bridges in contact with the respective pairs of stationary terminals, and the fork includes two pairs of arms respectively adapted to hold the two movable bridges in contact with, and spaced apart from, the two pairs of stationary terminals.

5. The electrical disconnect device according to claim 1, wherein the movement conversion means comprise a cam having a profile that presents at least three seats, a lug shaft that is formed integrally with the fork and that includes at least one lug that is adapted to travel along the profile of the cam, and resilient return means for returning the lug against the profile of the cam.

6. The electrical disconnect device according to claim 1, wherein the electromagnetic control system comprises a core that is made of magnetic material and that is mounted to move in a body, a coil that surrounds said core and that is adapted to receive an electrical current so as to generate a magnetic field that delivers a traction force on said core, a movable shaft that bears axially against the core and that is coupled to said movable bridge, and first resilient return means for pushing the movable shaft towards the rear, against the core.

7. The electrical disconnect device according to claim 6, wherein the movable bridge is engaged around the movable shaft, and second resilient return means are provided for pushing the movable bridge towards the front, against an abutment provided on the movable shaft.

8. The electrical disconnect device according to claim 1, wherein locking means are provided for locking the manual drive means in the forced-open position.

9. The electrical disconnect device according to claim 8, wherein a casing is provided that houses the movable bridge and the electromagnetic control system, wherein the manual drive means comprise a knob, and wherein said locking means comprise an opening that is situated in the knob, and a cavity groove elsewhere that is situated recessed into the casing, in the axis of said opening when the manual drive means are in the forced-open position.

* * * * *